(12) United States Patent
Bae et al.

(10) Patent No.: US 12,439,131 B2
(45) Date of Patent: Oct. 7, 2025

(54) APPARATUS AND METHOD FOR GENERATING PERSONALIZED HIGHLIGHT

(71) Applicant: ELECTRONICS AND TELECOMMUNICATIONS RESEARCH INSTITUTE, Daejeon (KR)

(72) Inventors: Su-Young Bae, Daejeon (KR); Sang-Kwang Lee, Daejeon (KR); Seung-Jin Hong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 90 days.

(21) Appl. No.: 18/584,138

(22) Filed: Feb. 22, 2024

(65) Prior Publication Data

US 2025/0203174 A1    Jun. 19, 2025

(30) Foreign Application Priority Data

Dec. 13, 2023  (KR) .................. 10-2023-0180936

(51) Int. Cl.
*H04N 21/81*   (2011.01)
*A63F 13/86*   (2014.01)
*H04N 21/233*  (2011.01)
*H04N 21/234*  (2011.01)
*H04N 21/8549* (2011.01)

(52) U.S. Cl.
CPC ......... *H04N 21/8106* (2013.01); *A63F 13/86* (2014.09); *H04N 21/233* (2013.01); *H04N 21/23418* (2013.01); *H04N 21/8549* (2013.01)

(58) Field of Classification Search
CPC ............. H04N 21/8106; H04N 21/233; H04N 21/23418; H04N 21/8549; H04N 21/4662; H04N 21/8126; A63F 13/86; A63F 13/79; G06V 20/42; G06V 20/47; G10L 25/27; G10L 25/57
See application file for complete search history.

(56) References Cited

U.S. PATENT DOCUMENTS

| | | |
|---|---|---|
| 2007/0146549 A1 | 6/2007 | Suh |
| 2020/0168202 A1 | 5/2020 | Park et al. |
| 2020/0228864 A1 | 7/2020 | Gudmundsson et al. |

FOREIGN PATENT DOCUMENTS

| | | |
|---|---|---|
| KR | 10-2003-0056783 A | 7/2003 |
| KR | 10-2009-0019582 A | 2/2009 |
| KR | 10-2020-0062865 A | 6/2020 |
| KR | 10-2020-0075086 A | 6/2020 |
| KR | 10-2023-0012800 A | 1/2023 |
| KR | 10-2023-0099180 A | 7/2023 |

*Primary Examiner* — Anthony Bantamoi

(57) ABSTRACT

Disclosed herein is an apparatus and method for generating a personalized highlight. The apparatus includes memory in which at least one program is recorded and a processor for executing the program. The program may generate respective highlight candidate lists for video data, background sound data, and commentary data separated from game data based on pretrained AI models and generate a highlight reflecting user preferences from a highlight list that is generated based on the generated highlight candidate lists.

20 Claims, 8 Drawing Sheets

APPARATUS AND METHOD FOR GENERATING PERSONALIZED HIGHLIGHT

CROSS REFERENCE TO RELATED APPLICATION

This application claims the benefit of Korean Patent Application No. 10-2023-0180936, filed Dec. 13, 2023, which is hereby incorporated by reference in its entirety into this application.

BACKGROUND OF THE INVENTION

1. Technical Field

The disclosed embodiment relates to technology for generating highlights of games or electronic sports (esports).

2. Description of the Related Art

Electronic sports (esports) is popular sports among the younger generation under 30s, after soccer and baseball, and various professional leagues for each game and region and various kinds of amateur leagues are held. Also, as esports is adopted as an official sport in Asian Games, it increasingly solidifies its position as sports. For example, 662.6 million people watched live esports in 2021, and the viewership of esports surpasses the combined viewership of Major League Baseball, NFL, and NBA in U.S.

Esports can be commonly enjoyed by watching game plays on video platforms such as YouTube, Twitter, etc., rather than traditional broadcast platforms, and has an advantage in which viewers can watch the sports events using mobile electronic devices anywhere, anytime. That is, not only the demand for live streaming but also the demand for on-demand viewing, which allows users to enjoy desired video anywhere when they want, are very high, which leads to a significant increase in demand for production and use of esports content. Accordingly, the global esports industry keeps rapid growth of over 10% annually.

With the growing interest in esports and games and the continuous increase in the demand therefor, a highlight provision service, which enables users to view main content of a game in a short time, also gains popularity.

However, most highlights are manually generated by people who can understand and analyze the game content. That is, due to manpower and cost limitations, highlight videos are generated primarily for key matches in which many users are interested, and services for providing highlights to which the tastes of individual users are reflected are not provided.

Meanwhile, highlight videos can be automatically generated for some games by downloading game play data through APIs provided by game companies, but this depends on the policies of the game companies providing the APIs and is difficult to be generally applied to various other types of game content for which APIs are not provided.

SUMMARY OF THE INVENTION

An object of the disclosed embodiment is to reduce manpower and cost for generating real-time game highlights of esports games and game play content.

Another object of the disclosed embodiment is to reflect the tastes of individual users when real-time game highlights of esports games and game play content are generated.

The disclosed embodiment is applied to various kinds of game content for which an API for highlights is not provided by a game company, thereby enabling highlights for the game contents to be generated.

An apparatus for generating a personalized highlight according to an embodiment includes memory in which at least one program is recorded and a processor for executing the program. The program may generate highlight candidate lists respectively for video data, background sound data, and commentary data separated from game data based on pre-trained Artificial Intelligence (AI) models and generate a highlight in which user preferences are reflected from a highlight list that is generated based on the generated highlight candidate lists.

Here, the program may extract frames from the video data at predetermined intervals, generate a key event occurrence list from the extracted frames based on an image learning model, generate a key event occurrence section list based on a result of analyzing a change in at least one predetermined image attribute and a change in a character attribute in the extracted frames, and generate the highlight candidate list by combining the key event occurrence list and the key event occurrence section list.

Here, the image learning model may be pretrained with image data including at least one of a character, an indicator, a skill, a function, an ability, or a travel path, or a combination thereof.

Here, the image attribute may include at least one of color, brightness, or saturation, or a combination thereof, and the character attribute may include at least one of movement, a travel distance, or the number of characters, or a combination thereof.

Here, the program may split the background sound data at regular intervals, generate a key event occurrence list from the split background sound data based on a background sound learning model, generate a key event occurrence section list based on a result of analyzing a background sound frequency characteristic in the split background sound data, and generate the highlight candidate list by combining the key event occurrence list and the key event occurrence section list.

Here, the background sound learning model may be pretrained with acoustic data including at least one of game background sound, or a battle sound effect, or a combination thereof.

Here, the program may split the commentary data at regular intervals, generate a key event occurrence list from the split commentary data based on a commentary learning model, generate a key event occurrence section list based on a result of analyzing at least one predetermined voice attribute in the split commentary data, and generate the highlight candidate list by combining the key event occurrence list and the key event occurrence section list.

Here, the predetermined voice attribute may include at least one of volume, pitch, or speed, or a combination thereof.

Here, the program may extract a user highlight list in which the user preferences are reflected from the highlight list, generate video clips for respective entries in the extracted user highlight list, and generate a user highlight video by combining the generated video clips.

Here, for the video clips and the highlight video, at least one of the lengths thereof, or the captions thereof, or a combination of the lengths and the captions may be edited through a previewer.

A method for generating a personalized highlight according to an embodiment may include separating video data, background sound data, and commentary data from game data, generating highlight candidate lists respectively for the video data, the background sound data, and the commentary data based on pretrained AI models, generating a highlight list by combining the generated highlight candidate lists, and generating a highlight in which user preferences are reflected from the generated highlight list.

Here, generating the highlight candidate lists may include extracting frames from the video data at predetermined intervals, generating a key event occurrence list from the extracted frames based on an image learning model, generating a key event occurrence section list based on a result of analyzing a change in at least one predetermined image attribute and a change in a character attribute in the extracted frames, and generating the highlight candidate list by combining the key event occurrence list and the key event occurrence section list.

Here, the image learning model may be pretrained with image data including at least one of a character, an indicator, a skill, a function, an ability, or a travel path, or a combination thereof.

Here, the image attribute may include at least one of color, brightness, or saturation, or a combination thereof, and the character attribute may include at least one of movement, a travel distance, or the number of characters, or a combination thereof.

Here, generating the highlight candidate lists may include splitting the background sound data at regular intervals, generating a key event occurrence list from the split background sound data based on a background sound learning model, generating a key event occurrence section list based on a result of analyzing a background sound frequency characteristic in the split background sound data, and generating the highlight candidate list by combining the key event occurrence list and the key event occurrence section list.

Here, the background sound learning model may be pretrained with acoustic data including at least one of game background sound, or a battle sound effect, or a combination thereof.

Here, generating the highlight candidate lists may include splitting the commentary data at regular intervals, generating a key event occurrence list from the split commentary data based on a commentary learning model, generating a key event occurrence section list based on a result of analyzing at least one predetermined voice attribute in the split commentary data, and generating the highlight candidate list by combining the key event occurrence list and the key event occurrence section list.

Here, the predetermined voice attribute may include at least one of volume, pitch, or speed, or a combination thereof.

Here, generating the highlight may include extracting a user highlight list in which the user preferences are reflected from the highlight list, generating video clips for respective entries in the extracted user highlight list, and generating a user highlight video by combining the generated video clips.

Here, for the video clips and the highlight video, at least one of the lengths thereof, or the captions thereof, or a combination of the lengths and the captions may be edited through a previewer.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

Figure 1:
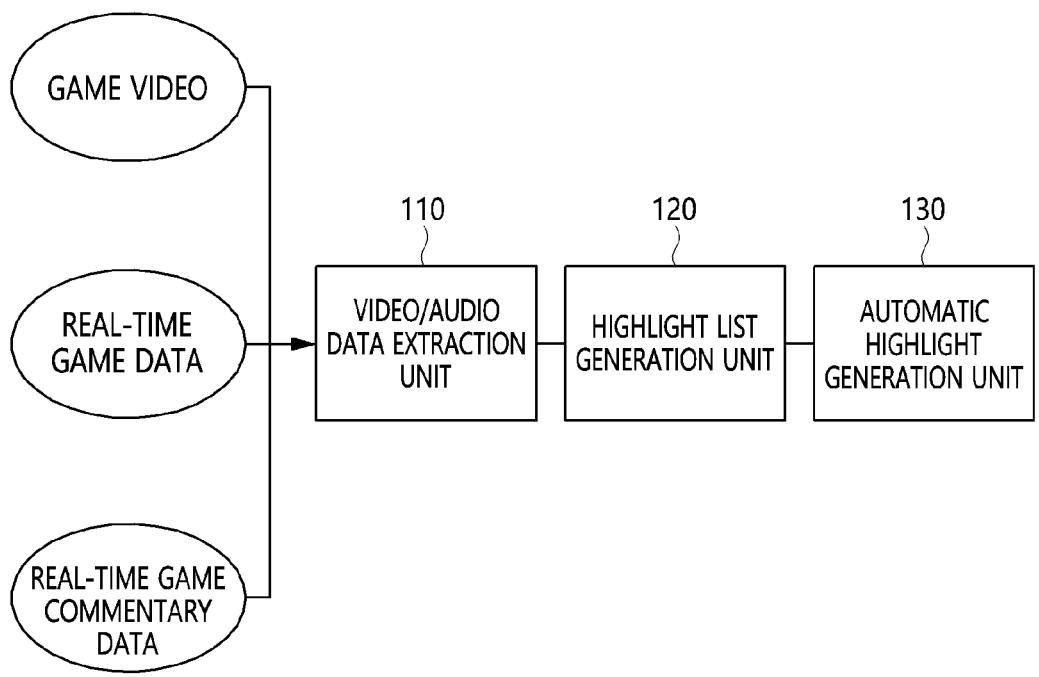
FIG. 1 is a schematic block diagram of an apparatus for generating a personalized highlight according to an embodiment.

The advantages and features of the present disclosure and methods of achieving them will be apparent from the following exemplary embodiments to be described in more detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only and are not intended to limit the present disclosure. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

Figure 2:
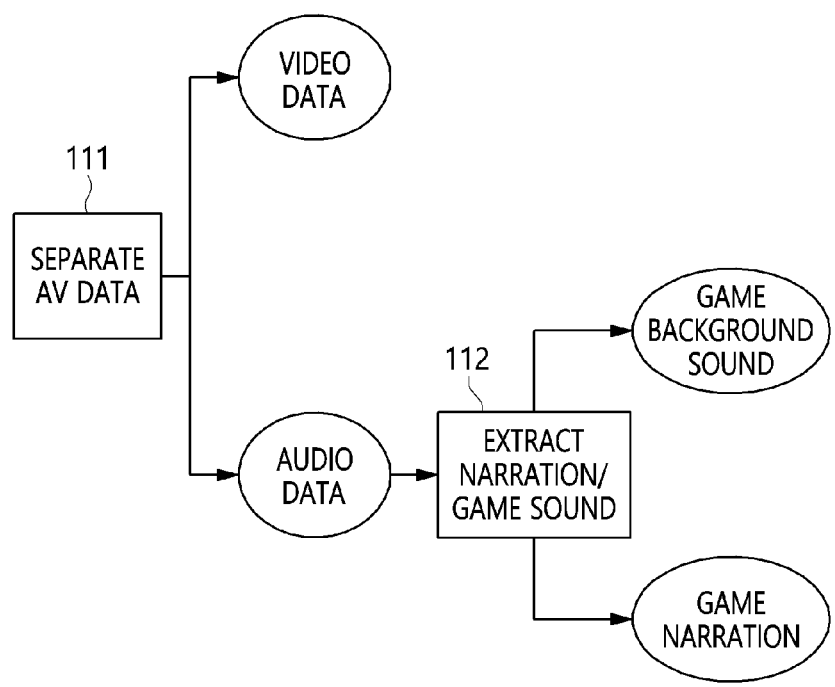
FIG. 2 is a detailed operation configuration diagram of a video/audio data extraction unit according to an embodiment.
Figure 3:
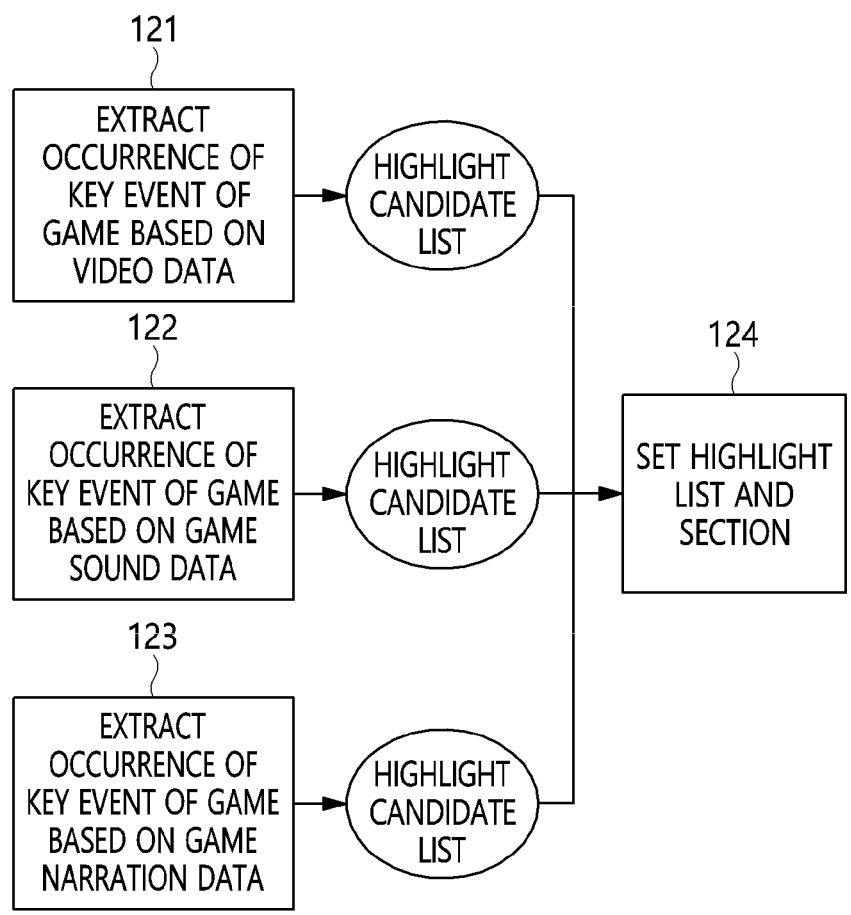
FIG. 3 is a detailed operation configuration diagram of a highlight list generation unit according to an embodiment.

FIG. 1 is a schematic block diagram of an apparatus for generating a personalized highlight according to an embodiment, FIG. 2 is a detailed operation configuration diagram of a video/audio data extraction unit according to an embodiment, and FIG. 3 is a detailed operation configuration diagram of a highlight list generation unit according to an embodiment.

Referring to FIG. 1, an apparatus for generating a personalized highlight according to an embodiment receives esports game data and game play data, such as game video, sound, and commentary, in real time or non-real time and analyzes the same based on AI, image processing, and signal processing, thereby automatically generating a highlight in which user preferences are reflected.

To this end, the apparatus for generating a personalized highlight according to an embodiment may include a video/audio data extraction unit 110, a highlight list generation unit 120, and an automatic highlight generation unit 130.

The video/audio data extraction unit 110 may extract video data, background sound data, and commentary data that are separated from game data input thereto.

Here, the game data may include, for example, game video, real-time game data, real-time game commentary data, and the like, as illustrated in FIG. 1.

Referring to FIG. 2, the video/audio data extraction unit 110 may separate the input game data into audio data and video data (111) and extract game background sound data and game commentary data (or a game narration) from the audio data (112).

The highlight list generation unit 120 generates respective highlight candidate lists for the video data, the background sound data, and the commentary data based on pretrained AI models and generates a highlight list by combining the highlight candidate lists.

That is, the video data, the game commentary data, and the game background sound data are separated, and methods suitable for the characteristics of the respective types of data are applied, whereby the content of key events and key moments capable of being a highlight may be detected.

Referring to FIG. 3, the highlight list generation unit 120 may generate a highlight candidate list using the video data by extracting occurrences of key events of a game based on image data (121), generate a highlight candidate list using the game background sound and sound effects by extracting occurrences of key events of the game based on game sound data (122), and generate a highlight candidate list using the commentaries of game commentators or narration data provided in the game by extracting occurrences of key events of the game based on game narration data (123).

Generating the highlight candidate lists will be described in detail later with reference to FIGS. 4 to 6.

Also, the highlight list generation unit 120 generates a single combined highlight list by combining the highlight candidate lists extracted for the respective types of data.

Here, additional information, such as time information for game key events and moments, associated game characters, detailed information about the occurring events, and the like, may be included in the highlight list.

Referring again to FIG. 1, the automatic highlight generation unit 130 may generate a highlight, in which user preferences are reflected, from the highlight list.

That is, the automatic highlight generation unit 130 selects key moments desired or required by a user from the combined highlight list, thereby generating a highlight video. For example, when a user selects a game player, such as a team, a champion, or the like that the user supports or is interested in, or key events occurring during the game, a highlight video for the key moments, in which the relevant information is included, is automatically generated.

Generating the highlight will be described in detail later with reference to FIG. 7.

Figure 4:
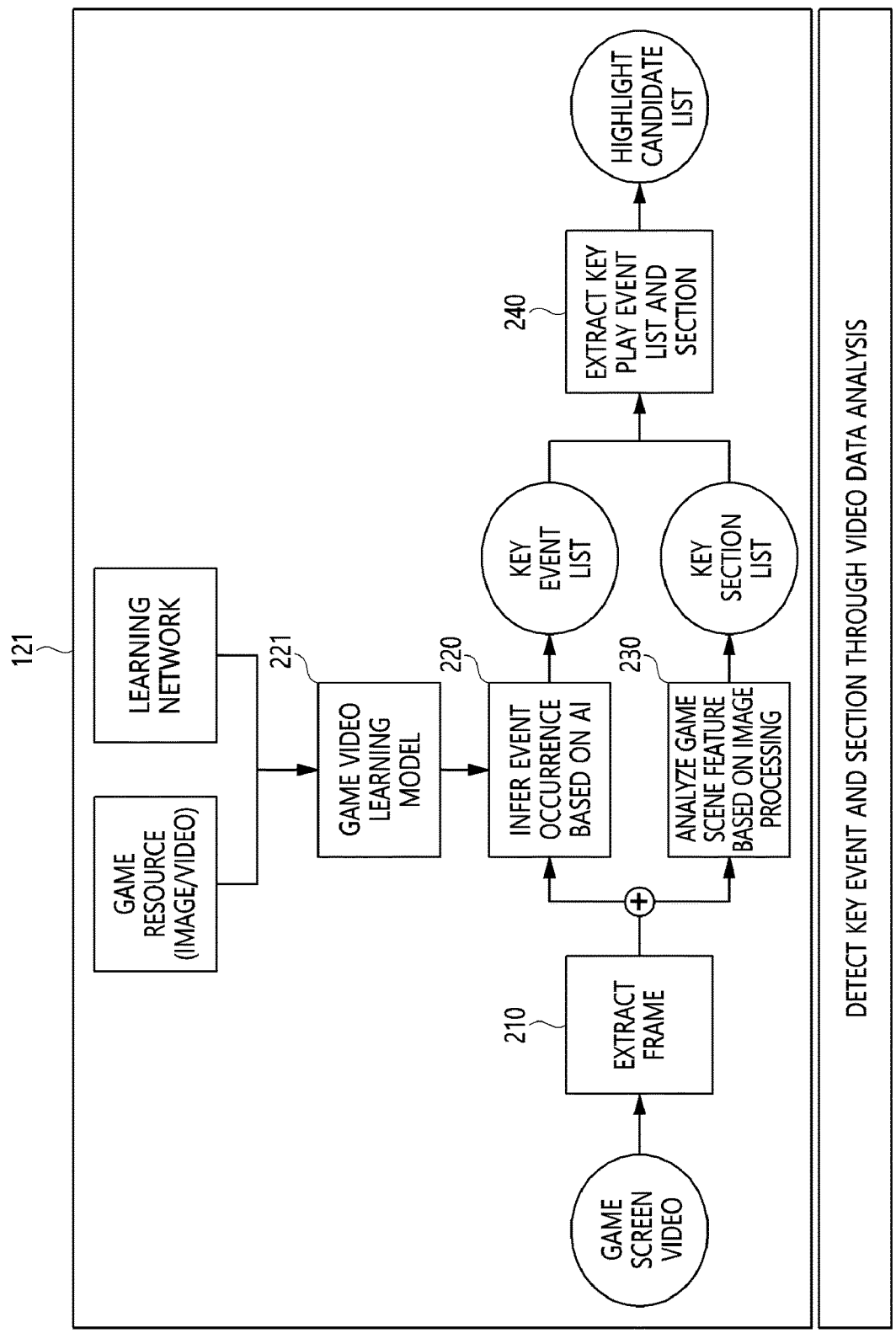
FIG. 4 is a view for explaining detailed operations for extracting occurrences of key events of a game based on video data according to an embodiment.

FIG. 4 is a view for explaining detailed operations for extracting occurrences of key events of a game based on video data according to an embodiment.

Referring to FIG. 4, frames are extracted from video data at predetermined intervals (210).

Subsequently, a key event occurrence list may be generated from the extracted frames based on an image learning model (220).

That is, key events occurring during the game play are detected in a game screen by analyzing the frames. Detecting the game events may comprise detecting a screen area showing various kinds of information in the game and automatically inferring and acquiring the details of the occurring event through the image learning model.

Here, the image learning model 221 may be pretrained with image data including at least one of a character, an indicator, a skill, a function, an ability, or a travel path, or a combination thereof.

Meanwhile, a key event occurrence section list may be generated based on a result of analyzing a change in at least one predetermined image attribute and a change in a character attribute in the extracted frames (230).

Here, the image attribute may include at least one of color, brightness, or saturation, or a combination thereof, and the character attribute may include at least one of movement, a travel distance, or the number of characters, or a combination thereof.

That is, the variation in the color, brightness, and saturation in a general gameplay image and a situation in which a battle or a fight occurs, the movement of a character in the scene, the travel distance of a character, the number of characters, and the like are analyzed through an image-processing algorithm, whereby the time at which a key play occurred may be predicted.

Subsequently, a highlight candidate list may be generated by combining the key event occurrence list and the key event occurrence section list (240).

Here, according to an embodiment, both inferring event occurrences based on AI (220) and analyzing game scene feature analysis based on image processing (230) may be performed, or only one of them may be performed according to need.

Figure 5:
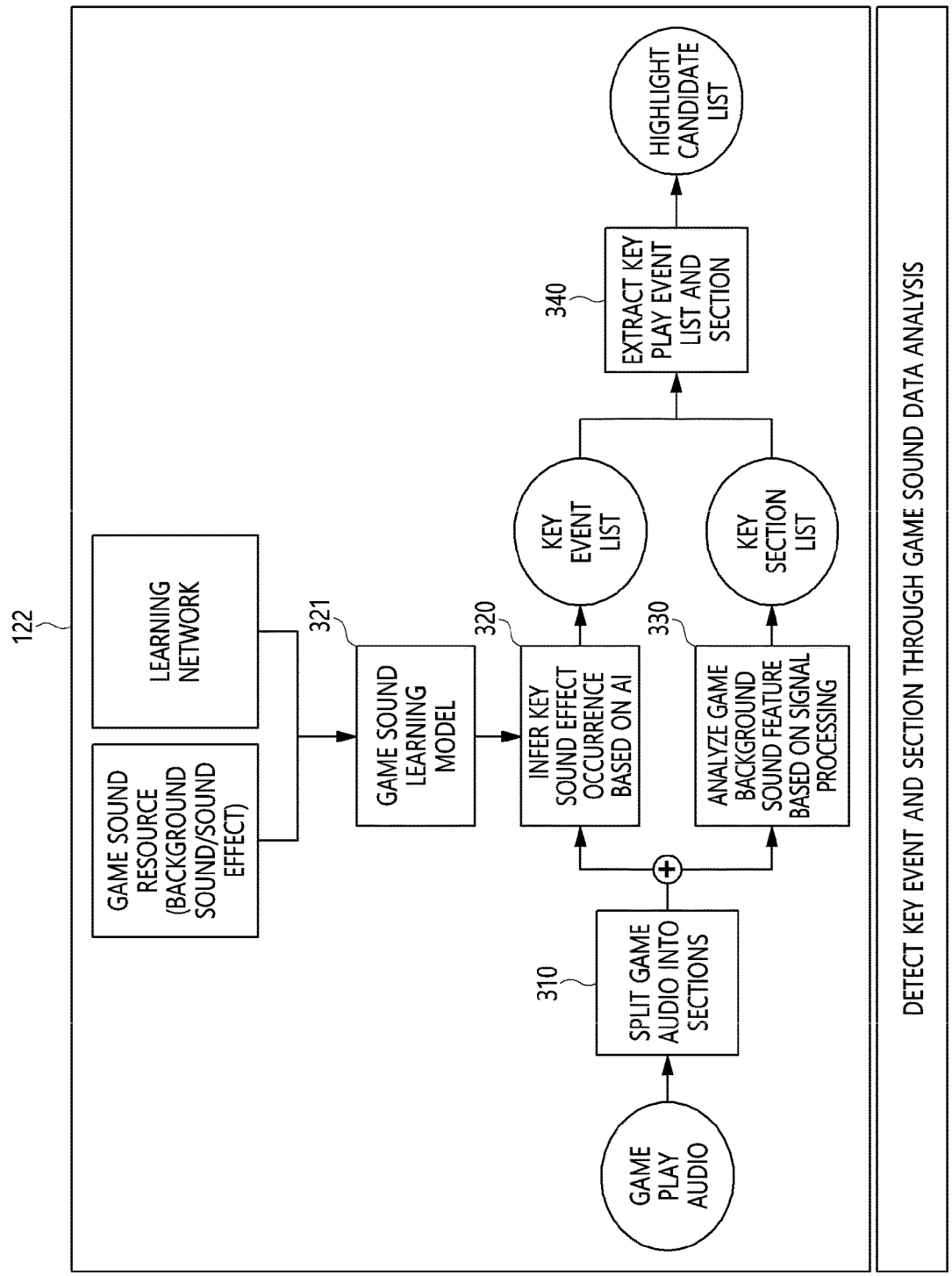
FIG. 5 is a view for explaining detailed operations for extracting occurrences of key events of a game based on game sound data according to an embodiment.

FIG. 5 is a view for explaining detailed operations for extracting occurrences of key events of a game based on game sound data according to an embodiment.

Referring to FIG. 5, background sound data may be split at regular intervals (310). That is, gameplay sound data is input and is then split by moving the data input window at regular intervals, and AI-based data analysis and sound-processing-based data analysis are performed thereon, whereby key events and moments of the game are retrieved.

That is, a key event occurrence list may be generated from the split background sound data based on a background sound learning model (320).

Here, the background sound learning model 321 may be pretrained with acoustic data including at least one of game background sound, or a battle sound effect, or a combination thereof.

Also, a key event occurrence section list may be generated based on a result of analyzing a background sound frequency characteristic in the split background sound data (330). That is, through the sound-processing-based data analysis, occurrences of key battle sections are inferred or detected based on the frequency characteristic of the existing background sound and the frequency characteristic of the battle sound effect.

Subsequently, a highlight candidate list may be generated by combining the key event occurrence list and the key event occurrence section list (340).

Here, according to an embodiment, both inferring occurrences of key sound effects based on AI (320) and analyzing game background sound features based on signal processing (330) may be performed, or only one of them may be performed according to need.

Figure 6:
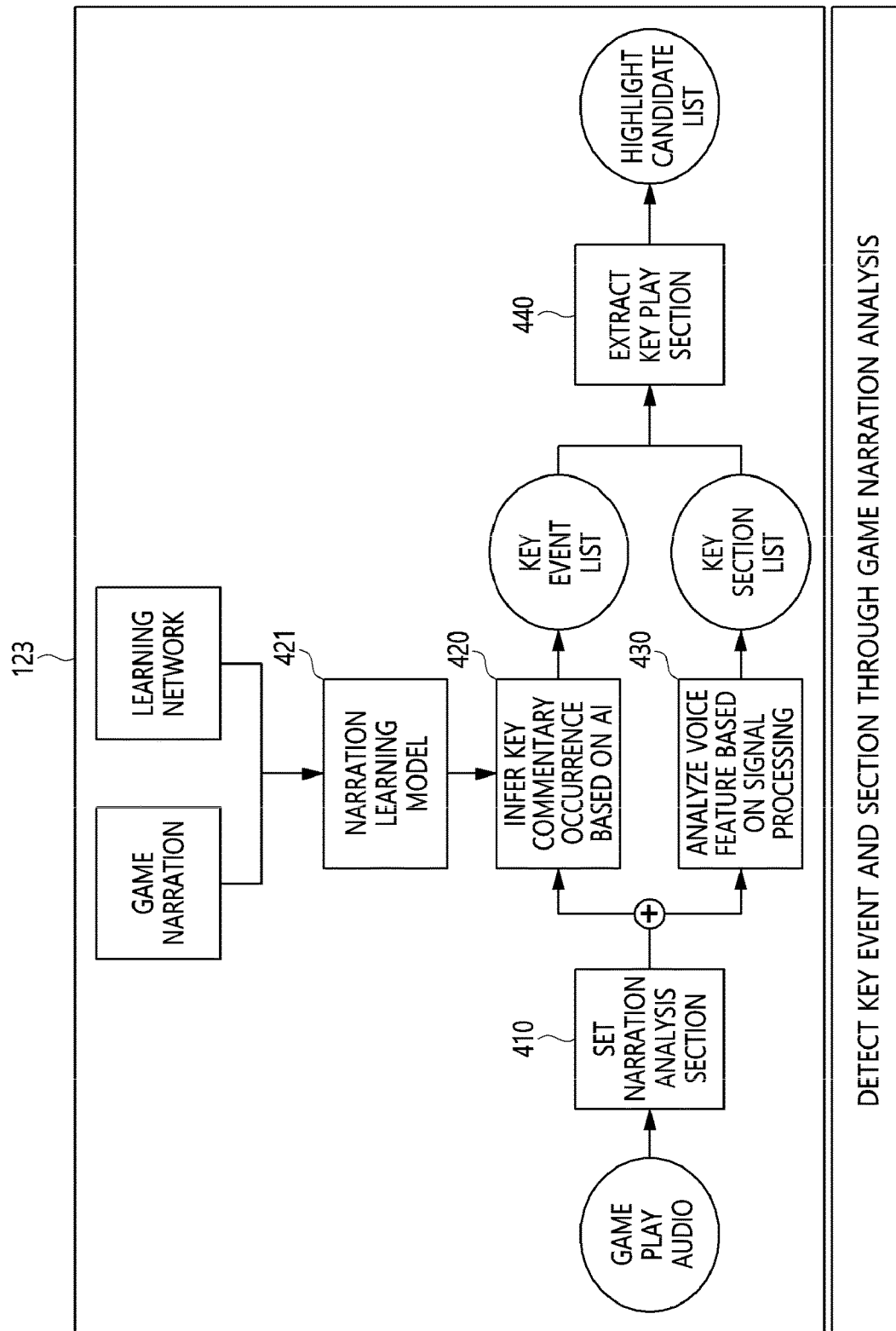
FIG. 6 is a view for explaining detailed operations for extracting occurrences of key events of a game based on game narration data according to an embodiment.

FIG. 6 is a view for explaining detailed operations for extracting occurrences of key events of a game based on game narration data according to an embodiment.

Referring to FIG. 6, commentary data may be split at regular intervals (410). That is, a commentary or audio description data in a game is input and is then split by moving the data input window at regular intervals, and AI-based data analysis (420) and voice-processing-based data analysis (430) are applied thereto, whereby the key moments of the game are retrieved.

That is, a key event occurrence list may be generated from the split commentary data base on a commentary learning model 421 (420). That is, key moments and the content of the game event are inferred by analyzing keywords spoken by a commentator and the narration of the game based on AI.

Also, a key event occurrence section list may be generated based on a result of analyzing at least one predetermined voice attribute based on the frequency characteristic of human voice in the split commentary data (430).

Here, the predetermined voice attribute may include at least one of volume, pitch, or speed, or a combination thereof.

Subsequently, a highlight candidate list may be generated by combining the key event occurrence list and the key event occurrence section list (440).

Here, according to an embodiment, both inferring occurrences of key narrations based on AI (420) and analyzing voice features based on signal processing (430) may be performed, or only one of them may be performed according to need.

Figure 7:
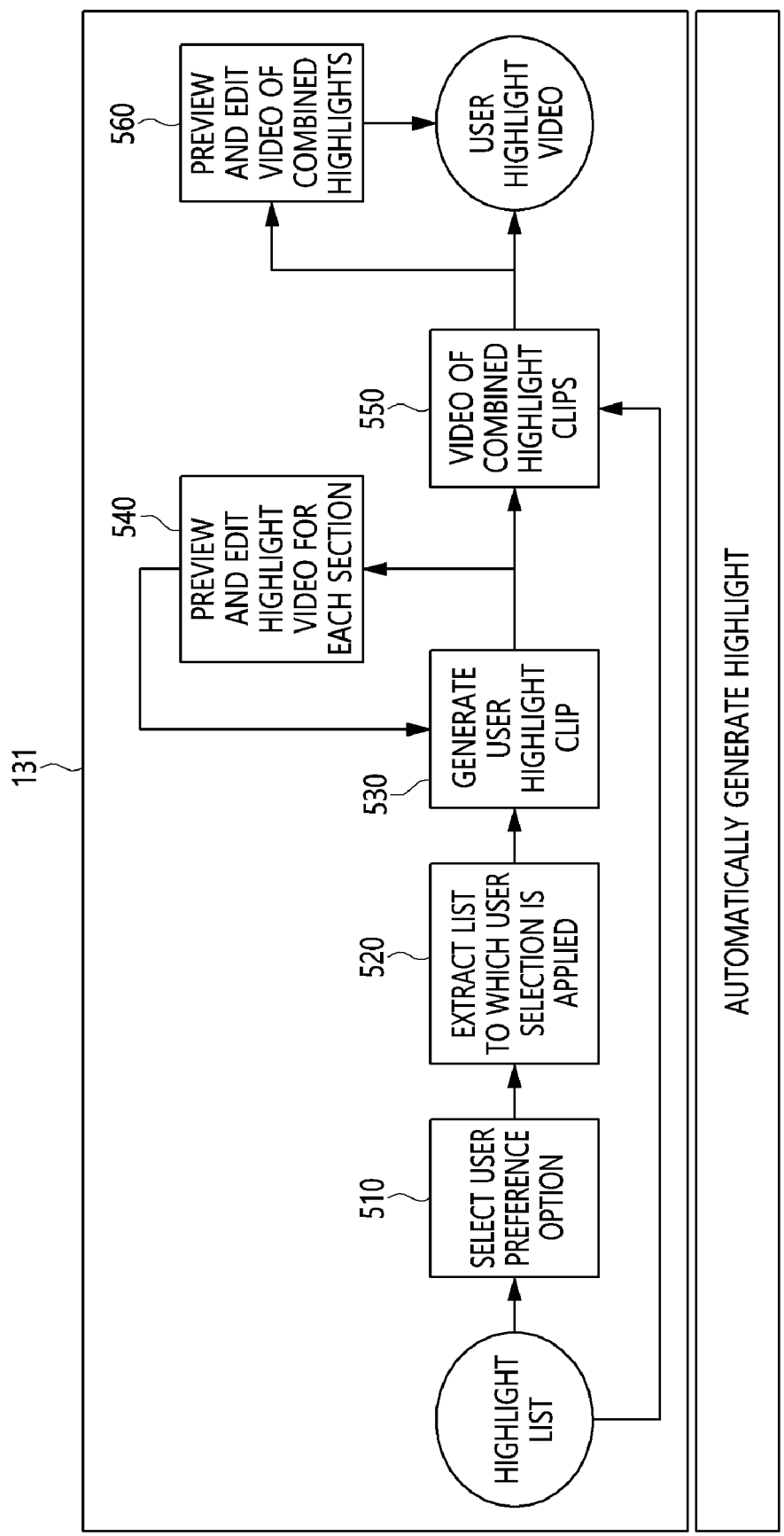
FIG. 7 is a view for explaining the detailed operation of an automatic highlight generation unit according to an embodiment.

FIG. 7 is a view for explaining the detailed operation of an automatic highlight generation unit according to an embodiment.

Referring to FIG. 7, a highlight video may be generated from the highlight list.

The highlight list contains the time at which each highlight moment occurs, a highlight section, event information, and the like. For example, a user may select only key events related to a champion that the user likes or events corresponding to battles such as teamfights from the generated highlight list, thereby generating a highlight. Also, key play events specialized for a certain game, for example, events based on which the main flow of the game can be understood, such as character Kill, Death, and Assistance (KDA) events, natural character and structure destruction events, and the like in a Multiplayer Online Battle Arena (MOBA) game, are selected, whereby a summary highlight video for the entire game may be generated.

To this end, a user preference option is selected (510), and a user highlight list to which the user preference option is applied is extracted from the highlight list (520).

Subsequently, video clips are generated for respective entries in the extracted user highlight list (530).

Here, at least one of the length of the video clip, or the caption thereof, or a combination of the length and the caption may be edited through a previewer (540).

Subsequently, a user highlight video may be generated by combining the generated video clips (550).

Here, for the video clips and the highlight video, at least one of the lengths thereof, or the captions thereof, or a combination of the lengths and the captions may be edited through the previewer (560). That is, the user previews the generated combined video and edits the length and caption of the entire video when necessary, thereby completing generation of the final user highlight.

Figure 8:
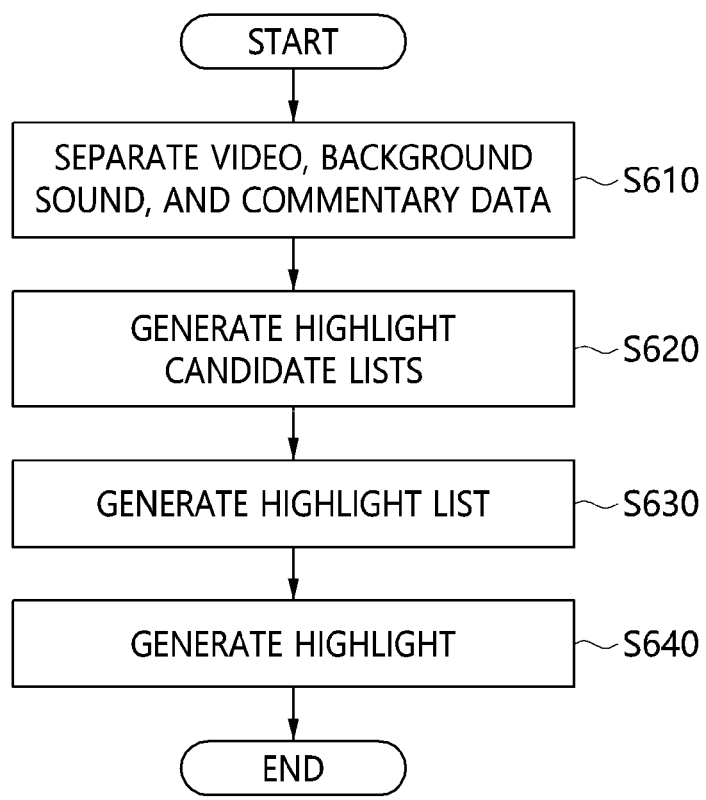
FIG. 8 is a flowchart for explaining a method for generating a personalized highlight according to an embodiment.

FIG. 8 is a flowchart for explaining a method for generating a personalized highlight according to an embodiment.

Referring to FIG. 8, the method for generating a personalized highlight according to an embodiment may include separating video data, background sound data, and commentary data from game data at step S610, generating highlight candidate lists respectively for the video data, the background sound data, and the commentary data based on pretrained AI models at step S620, generating a highlight list by combining the generated highlight candidate lists at step S630, and generating a highlight in which user preferences are reflected from the generated highlight list at step S640.

Here, generating the highlight candidate lists at step S620 may include extracting frames from the video data at predetermined intervals, generating a key event occurrence list from the extracted frames based on an image learning model, generating a key event occurrence section list based on a result of analyzing a change in at least one predetermined image attribute and a change in a character attribute in the extracted frames, and generating the highlight candidate list by combining the key event occurrence list and the key event occurrence section list.

Here, the image learning model may be pretrained with image data including at least one of a character, an indicator, a skill, a function, an ability, or a travel path, or a combination thereof.

Here, the image attribute may include at least one of color, brightness, or saturation, or a combination thereof, and the character attribute may include at least one of movement, a travel distance, or the number of characters, or a combination thereof.

Here, generating the highlight candidate lists at step S620 may include splitting the background sound data at regular intervals, generating a key event occurrence list from the split background sound data based on a background sound learning model, generating a key event occurrence section list based on a result of analyzing a background sound frequency characteristic in the split background sound data, and generating the highlight candidate list by combining the key event occurrence list and the key event occurrence section list.

Here, the background sound learning model may be pretrained with acoustic data including at least one of game background sound, or a battle sound effect, or a combination thereof.

Here, generating the highlight candidate lists at step S620 may include splitting commentary data at regular intervals, generating a key event occurrence list from the split commentary data based on a commentary learning model, generating a key event occurrence section list based on a result of analyzing at least one predetermined voice attribute in the split commentary data, and generating a highlight candidate list by combining the key event occurrence list and the key event occurrence section list.

Here, the predetermined voice attribute may include at least one of volume, pitch, or speed, or a combination thereof.

Here, generating the highlight at step S640 may include extracting a user highlight list in which user preferences are reflected from the highlight list, generating video clips for respective entries in the extracted user highlight list, and generating a user highlight video by combining the generated video clips.

Here, for the video clips and the highlight video, at least one of the lengths thereof, or the captions thereof, or a combination of the lengths and the captions may be edited through a previewer.

Figure 9:
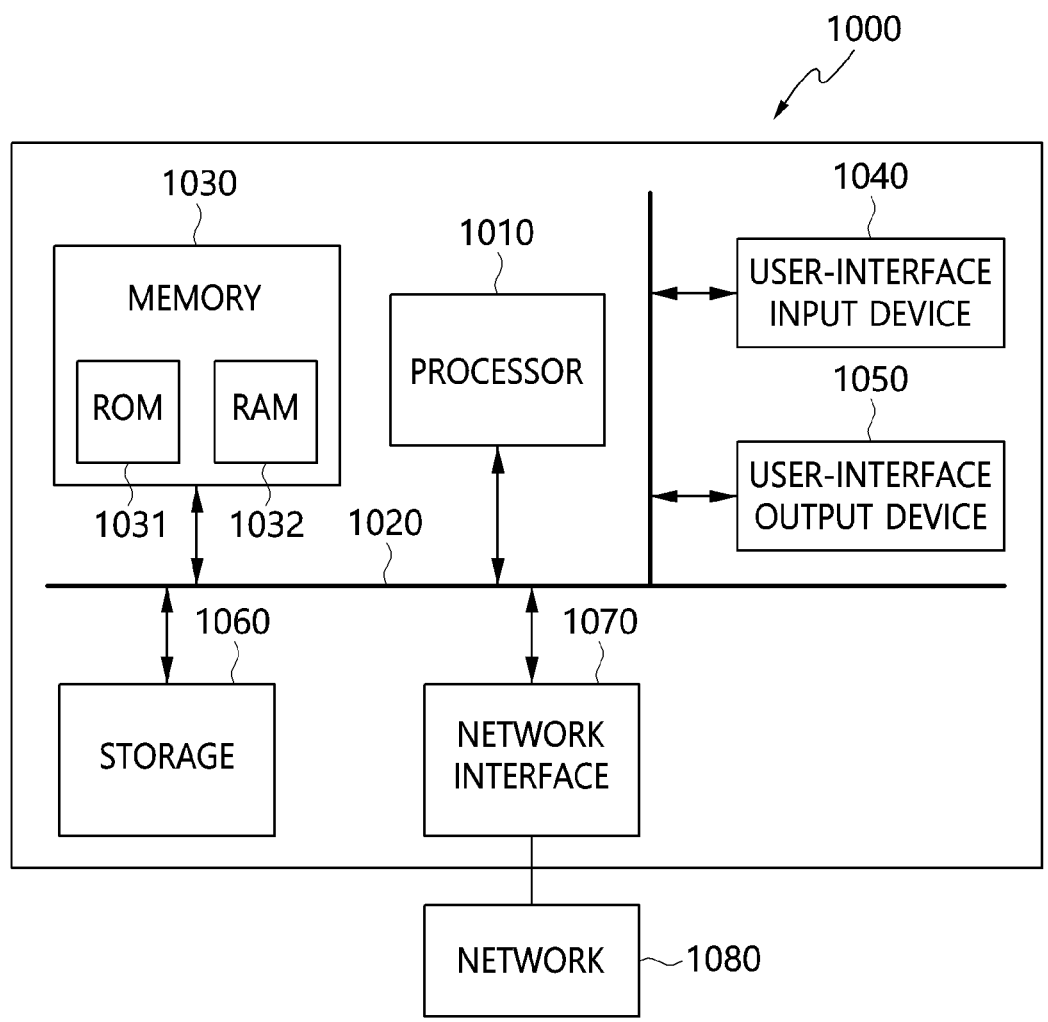
FIG. 9 is a view illustrating a computer system configuration according to an embodiment.

FIG. 9 is a view illustrating a computer system configuration according to an embodiment.

The apparatus for generating a personalized highlight according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected with a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a nonvolatile medium, a detachable medium, a non-detachable medium, a communication medium, or an information delivery medium, or a combination thereof. For example, the memory 1030 may include ROM 1031 or RAM 1032.

According to the disclosed embodiment, manpower and cost for generating real-time game highlights of esports games and game play content may be reduced.

According to the disclosed embodiment, when real-time game highlights of esports games and game play content are generated, the tastes of individual users may be reflected. That is, detailed information, such as key events occurring during a game, a situation in which game characters are involved, and the like, is recognized, and highlight videos for the event and situation desired by a user are extracted based thereon, whereby a personalized highlight video in which the preferences of the user are reflected may be generated. Accordingly, customized highlight content for a wide range of events, from big events such as the League of Legends world championship to amateur games of individual players, may be produced and provided in response to demand for real-time or on-demand viewing.

According to the disclosed embodiment, various services, such as training and coaching players for which immediate checking the play of a game and providing accurate feedback thereon are required, analyzing and recording the play of gamers, and the like, may be supported.

According to the disclosed embodiment, a highlight may be generated for various types of game content for which APIs for highlights are not provided by a game company. That is, key plays and key moments of a game are retrieved by applying data analysis technology based on AI or video/audio-signal processing to the gameplay video of a player and a game commentary, rather than depending on APIs and data provided by a game company, whereby a game highlight is automatically generated. Therefore, when a highlight video is generated, the burden of service development is lessened by reducing dependence on the game company, and highlight videos for a large number of game videos and various kinds of games may be easily generated.

Although the embodiments of the present disclosure have been described with reference to the accompanying drawings, those skilled in the art will appreciate that the present disclosure may be practiced in other specific forms without changing the technical spirit or essential features of the present disclosure. Therefore, the embodiments described above are illustrative in all aspects and should not be understood as limiting the present disclosure.

What is claimed is:

1. An apparatus for generating a personalized highlight, comprising:
   memory in which at least one program is recorded; and
   a processor for executing the program,
   wherein the program generates highlight candidate lists respectively for video data, background sound data, and commentary data separated from game data based on pretrained Artificial Intelligence (AI) models and generates a highlight in which user preferences are reflected from a highlight list that is generated based on the generated highlight candidate lists.

2. The apparatus of claim 1, wherein the program
   extracts frames from the video data at predetermined intervals,
   generates a key event occurrence list from the extracted frames based on an image learning model,
   generates a key event occurrence section list based on a result of analyzing a change in at least one predetermined image attribute and a change in a character attribute in the extracted frames, and
   generates the highlight candidate list by combining the key event occurrence list and the key event occurrence section list.

3. The apparatus of claim 2, wherein the image learning model is pretrained with image data including at least one of a character, an indicator, a skill, a function, an ability, or a travel path, or a combination thereof.

4. The apparatus of claim 2, wherein
   the image attribute includes at least one of color, brightness, or saturation, or a combination thereof, and
   the character attribute includes at least one of movement, a travel distance, or a number of characters, or a combination thereof.

5. The apparatus of claim 1, wherein the program
   splits the background sound data at regular intervals,
   generates a key event occurrence list from the split background sound data based on a background sound learning model,
   generates a key event occurrence section list based on a result of analyzing a background sound frequency characteristic in the split background sound data, and
   generates the highlight candidate list by combining the key event occurrence list and the key event occurrence section list.

6. The apparatus of claim 5, wherein the background sound learning model is pretrained with acoustic data including at least one of game background sound, or a battle sound effect, or a combination thereof.

7. The apparatus of claim 1, wherein the program splits the commentary data at regular intervals,
generates a key event occurrence list from the split commentary data based on a commentary learning model,
generates a key event occurrence section list based on a result of analyzing at least one predetermined voice attribute in the split commentary data, and
generates the highlight candidate list by combining the key event occurrence list and the key event occurrence section list.

8. The apparatus of claim 7, wherein the predetermined voice attribute includes at least one of volume, pitch, or speed, or a combination thereof.

9. The apparatus of claim 1, wherein the program extracts a user highlight list in which the user preferences are reflected from the highlight list, generates video clips for respective entries in the extracted user highlight list, and generates a user highlight video by combining the generated video clips.

10. The apparatus of claim 9, wherein, for the video clips and the highlight video, at least one of lengths thereof, or captions thereof, or a combination of the lengths and the captions are edited through a previewer.

11. A method for generating a personalized highlight, comprising:
separating video data, background sound data, and commentary data from game data;
generating highlight candidate lists respectively for the video data, the background sound data, and the commentary data based on pretrained Artificial Intelligence (AI) models;
generating a highlight list by combining the generated highlight candidate lists; and
generating a highlight in which user preferences are reflected from the generated highlight list.

12. The method of claim 11, wherein generating the highlight candidate lists includes
extracting frames from the video data at predetermined intervals,
generating a key event occurrence list from the extracted frames based on an image learning model,
generating a key event occurrence section list based on a result of analyzing a change in at least one predetermined image attribute and a change in a character attribute in the extracted frames, and
generating the highlight candidate list by combining the key event occurrence list and the key event occurrence section list.

13. The method of claim 12, wherein the image learning model is pretrained with image data including at least one of a character, an indicator, a skill, a function, an ability, or a travel path, or a combination thereof.

14. The method of claim 12, wherein
the image attribute includes at least one of color, brightness, or saturation, or a combination thereof, and
the character attribute includes at least one of movement, a travel distance, or a number of characters, or a combination thereof.

15. The method of claim 11, wherein generating the highlight candidate lists includes
splitting the background sound data at regular intervals,
generating a key event occurrence list from the split background sound data based on a background sound learning model,
generating a key event occurrence section list based on a result of analyzing a background sound frequency characteristic in the split background sound data, and
generating the highlight candidate list by combining the key event occurrence list and the key event occurrence section list.

16. The method of claim 15, wherein the background sound learning model is pretrained with acoustic data including at least one of game background sound, or a battle sound effect, or a combination thereof.

17. The method of claim 11, wherein generating the highlight candidate lists includes
splitting the commentary data at regular intervals,
generating a key event occurrence list from the split commentary data based on a commentary learning model,
generating a key event occurrence section list based on a result of analyzing at least one predetermined voice attribute in the split commentary data, and
generating the highlight candidate list by combining the key event occurrence list and the key event occurrence section list.

18. The method of claim 17, wherein the predetermined voice attribute includes at least one of volume, pitch, or speed, or a combination thereof.

19. The method of claim 11, wherein generating the highlight includes
extracting a user highlight list in which the user preferences are reflected from the highlight list,
generating video clips for respective entries in the extracted user highlight list, and
generating a user highlight video by combining the generated video clips.

20. The method of claim 19, wherein, for the video clips and the highlight video, at least one of lengths thereof, or captions thereof, or a combination of the lengths and the captions are edited through a previewer.

* * * * *